United States Patent

[11] 3,588,187

| [72] | Inventor | Robert S. Mueller<br>Southfield, Mich. |
|---|---|---|
| [21] | Appl. No. | 723,345 |
| [22] | Filed | Apr. 2, 1968 |
| [45] | Patented | June 28, 1971 |
| [73] | Assignee | Eaton Yale & Towne Inc.<br>Cleveland, Ohio |

[54] ANTI-SKID SYSTEM
31 Claims, 6 Drawing Figs.

[52] U.S. Cl.................................................. 303/21,
188/181
[51] Int. Cl.................................................. B60t 8/08
[50] Field of Search........................................ 303/21, 21
(A)4, (BE), (BB), (CE), (F); 188/181 (A)

[56] References Cited
UNITED STATES PATENTS

| 3,026,148 | 3/1962 | Ruof............................ | 303/21BE |
| 3,237,996 | 3/1966 | Lucien ........................ | 303/21BE |
| 3,292,977 | 12/1966 | Williams...................... | 303/21BE |
| 3,330,113 | 7/1967 | Perrino......................... | 303/21FX |
| 3,275,384 | 9/1966 | Hirzel........................... | 303/21A4 |
| 3,306,677 | 2/1967 | Dewar et al.................. | 303/21F |
| 3,441,320 | 4/1969 | Flory............................ | 303/21BB |
| 3,467,442 | 9/1969 | Davis............................ | 303/21F |

*Primary Examiner*—Duane A. Reger
*Attorney*—Yount, Flynn & Tarolli

ABSTRACT: Disclosed herein is an antiskid system for reducing the pressure applied to the brakes of a vehicle upon slipping of the wheels of the vehicle relative to a support surface. The antiskid system includes an assembly for producing a signal the magnitude of which is proportional to a function of the rotational speed of at least one wheel of the vehicle compared to the speed of the vehicle and a control assembly for reducing the pressure applied to the brakes by an amount which is proportional to the magnitude of the signal. A feedback assembly is included in the control assembly to enable the pressure applied to the brakes to be initially reduced at a relatively high rate for rapid response.

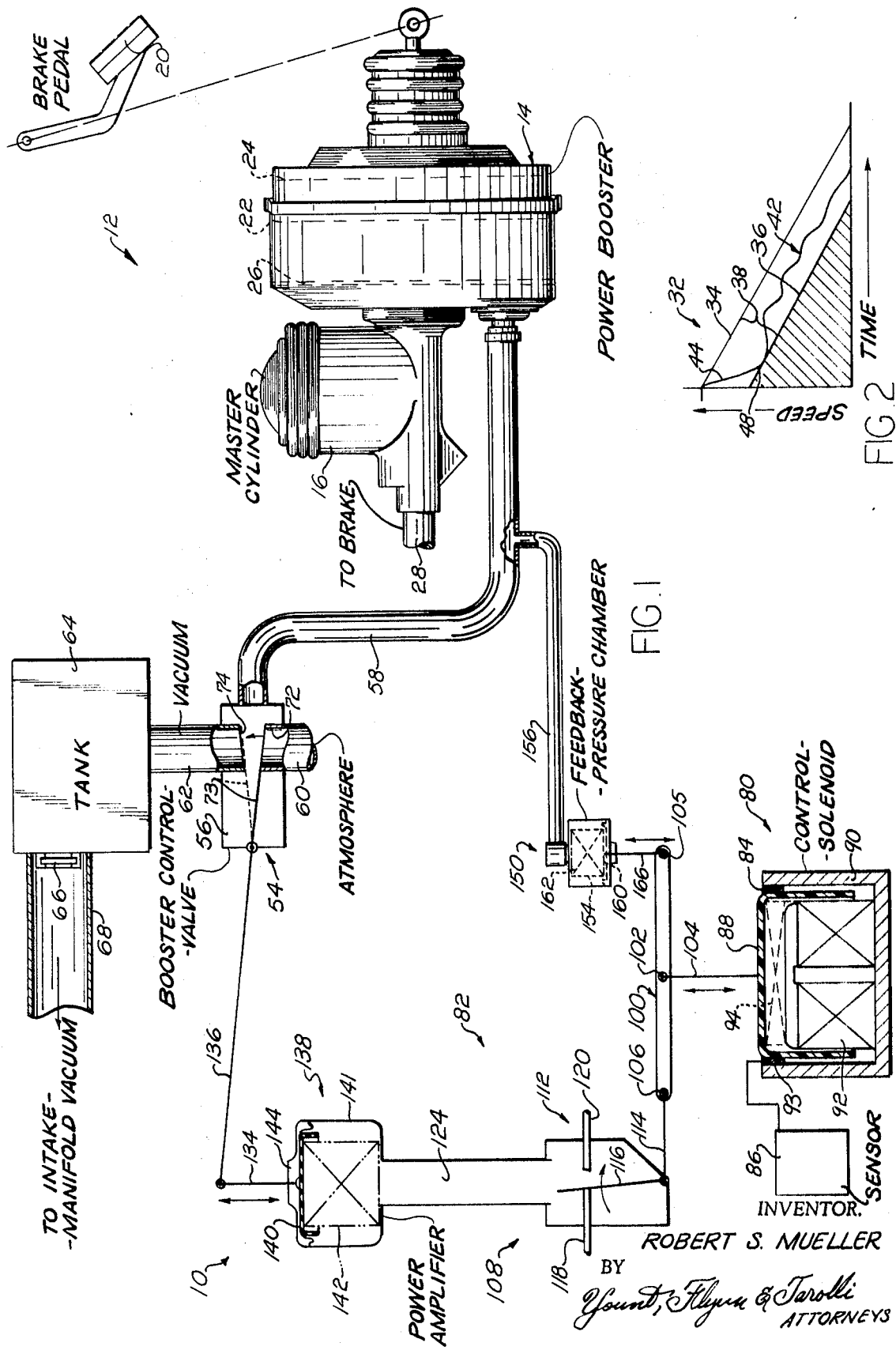

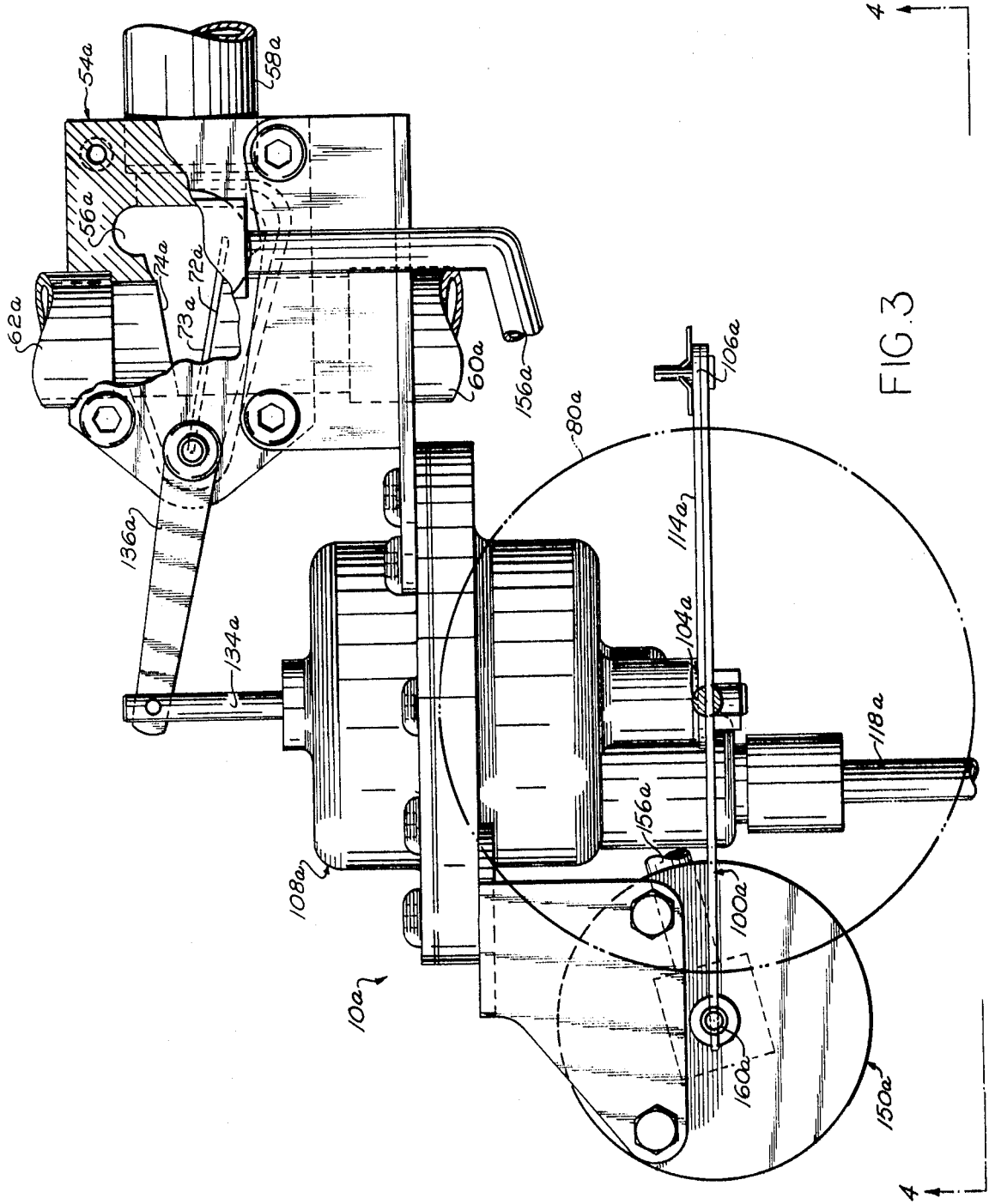

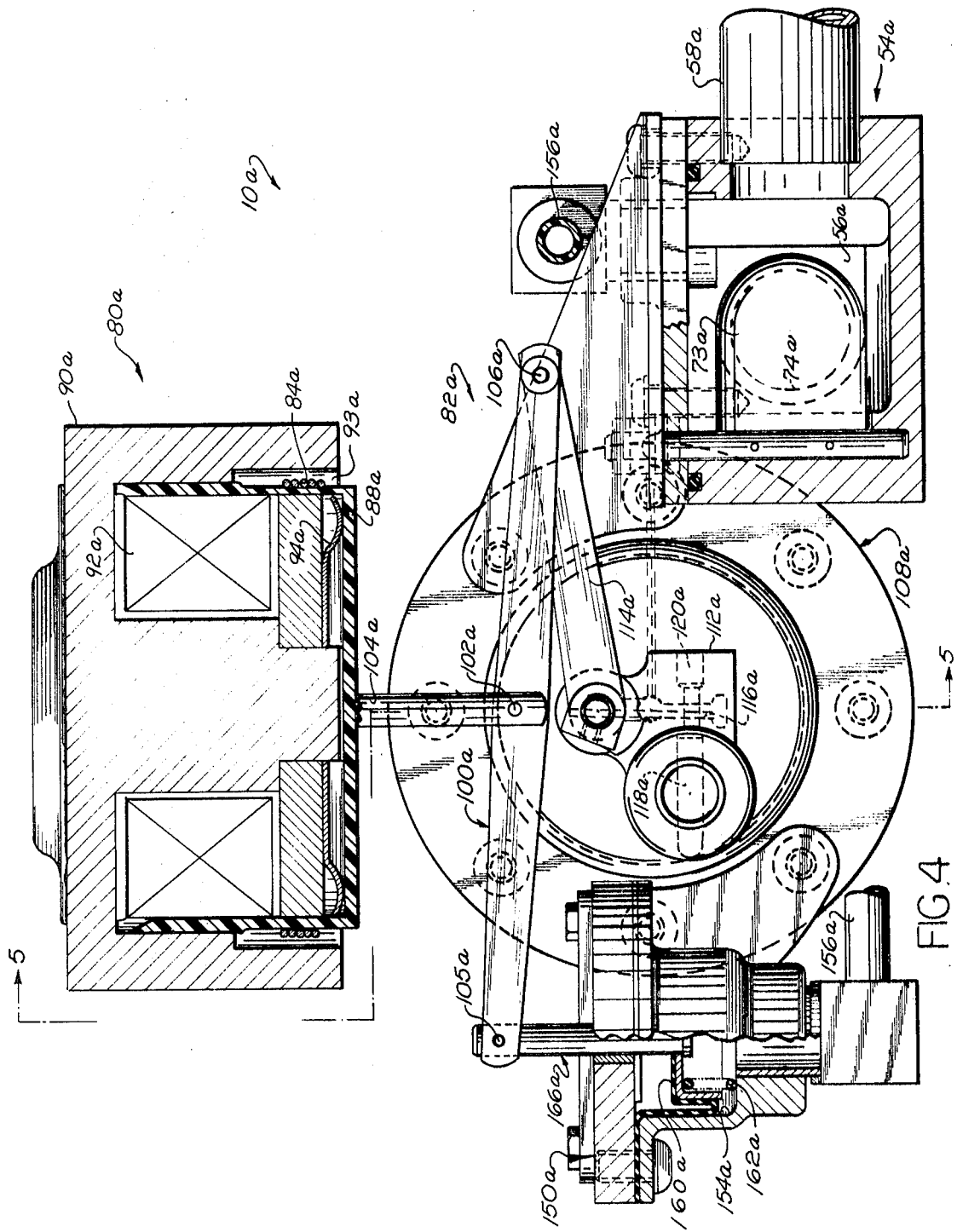

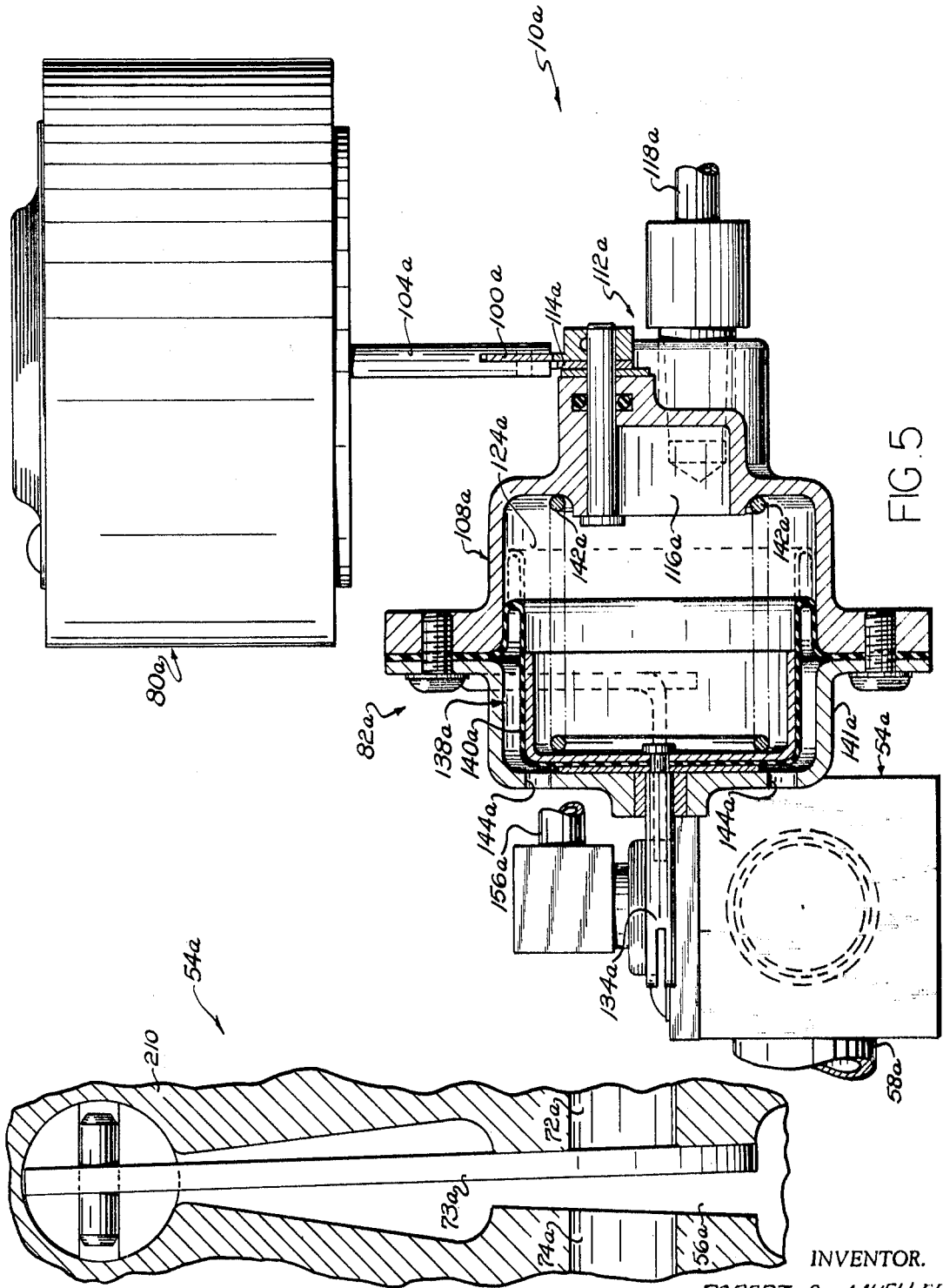

ANTI-SKID SYSTEM

When the brakes of the vehicle are applied, the speed of rotation of the wheels of the vehicle is reduced. Under certain conditions, objectionable slipping and wheel locking can occur upon application of the brakes. In order to reduce this objectionable slipping, vehicle antiskid systems have been provided for releasing the brakes of at least some of the wheels of the vehicle. These known antiskid systems usually include a device which is actuated to release the brakes upon a predetermined rate of vehicle deceleration.

While the above noted antiskid systems are effective to at least reduce objectionable slipping, they are somewhat unsatisfactory since they release and reengage the brakes of a vehicle as the vehicle is being slowed or stopped. The vehicle could be slowed or stopped in a shorter distance and time if the brakes of the vehicle were continuously engaged with a sufficient pressure to keep the speed of rotation of the wheels of the vehicle just above the minimum rotational speed which verges on objectionable slipping. Moreover, known antiskid systems are relatively slow in releasing the brakes in response to a slip signal which further adds to the time and distance required for safe stopping of the vehicle under operator control.

Therefore, it is an object of this invention to provide a new and improved vehicle antiskid system which rapidly responds to a slip signal to thereby minimize slipping and allowing the vehicle to be slowed or stopped in a relatively short time and distance.

Another object of this invention is to provide a new and improved vehicle antiskid system which is operative during braking of the vehicle to reduce the pressure actuating the brakes at a rate which is a function of a slip signal and which enables the brakes to be continuously engaged during the entire braking operation.

It is another object of this invention to provide a new and improved antiskid system which initially decreases the pressure applied to the brakes of a vehicle at a relatively high initial rate to enable the antiskid system to respond quickly to the presence or imminent possibility of objectionable slipping and which subsequently decreases said initial rate of pressure reduction as a function of a pressure reduction obtained by said relatively high initial rate of pressure reduction.

It is another object of this invention to provide a new and improved antiskid system comprising signal means for producing a slip signal which is proportional to a function of the rotational speed of at least one wheel of a vehicle compared to the speed of the vehicle, a valve operatively associated with the brakes of the vehicle, and control means operatively connected to said signal means and said valve for operating said valve from an initial condition to an extent which is a function of said slip signal to thereby reduce the pressure applied to the brakes at a rate which is a function of said slip signal.

It is another object of this invention to provide a new and improved antiskid system, as set forth in the preceding paragraph, wherein the signal means includes a control coil connected in an electrical circuit in which the voltage is varied with variations in the function of the rotational speed of at least one wheel of the vehicle compared to the speed of the vehicle, a source of a magnetic field which extends at least partially around the control coil, and a spring for urging the control coil in one direction relative to the source of a magnetic field, the control coil being movable in a direction opposite to the one direction against the urging of the spring due to the flow of current through the control coil which is located in the magnetic field.

It is another object of this invention to provide an antiskid system including a valve connected in fluid communication with a power booster for operating the brakes of a vehicle, signal means for providing a slip signal, and control means operatively connecting said valve and the signal means for operating the valve from one condition to a second condition to vary the pressure which is applied to the power booster at an initial rate which is proportional to the slip signal to thereby reduce the pressure actuating the brakes of the vehicle, and feedback means responsive to variations in the pressure applied to the power booster for operating the valve to decrease the initial rate of varying the pressure applied to the power booster.

It is another object of this invention to provide an antiskid system including a valve operable to vary the fluid pressure actuating the brakes of a vehicle, and a control means including a control coil associated with the valve and connected in an electrical circuit in which the voltage is varied to provide the slip signal, and a field coil for providing a magnetic field which extends at least partially around the control coil, the control coil being movable to operate the valve and reduce the fluid pressure actuating the brakes of the vehicle.

These and other objects and features of the invention will become more apparent upon a reading of the following detailed description taken in connection with the accompanying drawings wherein:

FIG. 1 is a schematic illustration of an antiskid system constructed in accordance with the present invention and associated with a vehicle brake system;

FIG. 2 is a graphic illustration of a hypothetical curve showing the speed of rotation of the wheels of a vehicle during braking of a vehicle having an antiskid system constructed in accordance with the present invention;

FIG. 3 is a partially broken away view illustrating the structure of a booster control valve and means for operating the valve in a preferred embodiment of the invention;

FIG. 4 is a partially broken away view, taken generally along the line 4—4 of FIG. 3, illustrating the structure of a control solenoid or slip signal assembly, a control member or lever, an amplifier assembly, the booster control valve, and a feedback assembly;

FIG. 5 is a sectional view, taken generally along the line 5—5 of FIG. 4, further illustrating the structure of the amplifier assembly; and FIG. 6 is an enlarged plan view of the booster control valve.

This invention relates to a system for reducing objectionable slipping of the wheels of a vehicle relative to a support surface. When objectionable slipping begins or is imminent, the antiskid system reduces the pressure applied to the brakes of the vehicle at a relatively high rate to insure a rapid response of the antiskid system. A feedback assembly is provided for decreasing the rate of pressure reduction as a function of the amount by which the pressure is reduced. Although it is contemplated that antiskid systems constructed in accordance with the present invention will be used in association with many different types of vehicle brake systems, an antiskid system 10 forming a preferred embodiment of the invention is illustrated schematically in FIG. 1 in association with a vehicle brake system 12 including a power booster 14 and master cylinder 16.

The brake system 12 is operated to actuate wheel brake assemblies (not shown) with fluid pressure to retard rotation of the wheels of the vehicle. When a brake pedal 20 is depressed, the power booster 14 is actuated to assist in operating the master cylinder 16. The power booster 14 is of the well-known diaphragm type and includes a diaphragm 22 separating a rear pressure chamber 24 from a front pressure chamber 26.

The master cylinder 16 is connected in fluid communication with wheel brake assemblies by a brake line 28. Operation of the master cylinder 16 by the power booster 14 increases the fluid pressure in the brake line 28 to operate the wheel brake assemblies in a well-known manner.

When a braking operation is initiated by depressing the brake pedal 20, air enters the rear chamber 24 of the power booster 14 to press the diaphragm 22 forwardly, or in the direction of the master cylinder 16, against a relatively low fluid pressure or "vacuum" in the front chamber 26. This movement of the diaphragm 22 actuates the master cylinder 16 to increase the fluid pressure in the line 28 and operate the brakes of the vehicle. When the brake pedal 20 is released, air enters the front chamber 26 to neutralize the power booster 14 and allow the diaphragm 22 to move to a neutral position.

Since the operation of the power booster 14 and master cylinder 16 in actuating the brakes of the vehicle is well known to those skilled in the art, it is believed that further discussion of the method of operation of the brake system 12 is not warranted at this time.

The brake system 12 is operated to retard the rate of rotation of the wheels of a vehicle to thereby slow or stop the vehicle. This braking or retarding of the rotation of the wheels of the vehicle frequently results in a slight or nonobjectionable slip wherein the wheels are still rolling on a support surface. However, if the rate of rotation of the wheels is greatly retarded by relatively large fluid pressures actuating the brake assemblies associated with the wheels, the wheels tend to lock up or rotate at a very slow rate relative to the support surface causing objectionable slipping of the vehicle. When this objectionable slipping begins, a relatively high coefficient of rolling friction between the wheels of the vehicle and the support surface is replaced by a relatively low coefficient of sliding friction and results in a corresponding decrease in vehicle traction. Objectionable slipping, as opposed to nonobjectionable slipping, occurs when the speed of rotation of the wheels of the vehicle is reduced to a relatively low rate compared to the speed of the vehicle.

The hypothetical stopping of a vehicle is illustrated in a graph 32 in FIG. 2 wherein a line 34 represents a speed of rotation of the wheels of the vehicle which corresponds to the speed of the vehicle, that is, a speed of rotation of the wheels at which the wheels rotate along the support surface without slipping or sliding. During a continuous and uniform slowing down of the vehicle without slipping, the speed of rotation of the wheels of the vehicle is reduced at a uniform rate as illustrated by the line 34. A line 36 illustrates a minimum rotational speed of the wheels for the same vehicle speed without incurring objectionable slip, that is the line 36 represents a rotational speed at which the wheels are slipping a relatively small amount relative to the support surface. At this minimum rotational speed, the coefficient of friction between the wheels and the surface is substantially equal to the coefficient of rolling friction. If at any given time the speed of rotation of the wheels is decreased below the line 36, objectionable slip begins. Thus, the shaded area of the graph 32 represents an area of objectionable slip. In order to minimize stopping or slowing time and distance during braking of a vehicle, it is desirable to maintain the rotational speed of the wheels of the vehicle in a range 38 between the lines 34 and 36, that is within a range of nonobjectionable slipping.

The antiskid system 10 functions to minimize the amount of objectionable slipping by maintaining the speed of rotation of the wheels within the nonobjectionable slip range 38 to thereby provide relatively rapid stopping or slowing of the vehicle in short distances. A hypothetical curve 42 illustrates this operation of the antiskid system 10. When the brake system 12 is initially actuated with a pressure on the brake pedal 20, the speed of rotation of the wheels of the vehicle is sharply decreased, as is illustrated by the sharply sloping portion 44 of the curve 42. When the speed of rotation of the wheels of the vehicle compared to the speed of the vehicle is tending toward objectionable slipping, the curve 42 moves toward the shaded objectionable slip range, as shown at 48 in FIG. 2. During any slipping of the wheels of the vehicle, the antiskid system 10 is operated to reduce the fluid pressure applied to the brakes of the vehicle to allow the speed of rotation of the wheels to increase to thereby reduce slipping. This operation of the antiskid system 10 is illustrated by the curve 42 in FIG. 2.

The antiskid system 10 reduces the fluid pressure applied to the wheel brake assemblies by increasing the pressure in the forward chamber 26 of the power booster 14 to thereby effect a corresponding reduction in the fluid pressure in the brake line 28. To this end, the pressure in the front chamber 26 of the power booster 14 is regulated by booster control valve 54. The booster control valve 54 is located in a chamber 56 and is connected by a conduit 58 to the forward chamber 26 of the power booster 14. The chamber 56 is connected to the atmosphere by a conduit 60 and is connected by a conduit 62 to a tank 64. The tank 64 is in turn connected through a check valve 66 and conduit 68 to a source of low pressure or "vacuum."

The control valve 54 normally blocks the flow of air through an outlet 72 of the conduit 60 with a valve element or member 73. Upon the occurrence of slipping, the control valve is operated from an initial position, in the direction of the arrow in FIG. 1, to enable air to flow through the conduits 60 and the conduit 58 to the chamber 26. This operation of the control valve 54 increases the fluid pressure in the chamber 26 and impedes the flow of air through an opening 74 in the conduit 62 to the tank 64. Increasing the fluid pressure in the chamber 26 results in a reduction in the pressure being applied to the wheel brake assemblies by the power booster 14 through the master cylinder 16 and brake line 28. Of course, the rate at which the fluid pressure in the chamber 26 and brake line 28 varies is a function of the distance through which the valve element 73 is moved from the initial position shown in FIG. 1.

The control valve 54 is operated to vary the pressure in the chamber 26 at a rate which is a function of the speed of rotation of a wheel of the vehicle compared to the speed of the vehicle to prevent objectionable slipping. To this end, a means for providing a signal or control solenoid or transducer 80 is connected by a control assembly 82 to the valve 54. The transducer or control solenoid 80 includes a control coil 84 which is connected to a sensor assembly 86. The control coil 84 is securely mounted on a nonmagnetizable cup-shaped housing 88 and is located between sections of a magnetizable base 90 of a continuously energized field coil 92. A magnetic field radiates from the field coil across the space or gap 83 in the base 90 and around the control coil 84. Therefore, energization of the control coil 84 by the sensor assembly 86 results in the control coil being moved inwardly against the urging of a spring 94.

Upon initiation of any degree of wheel slipping, the sensor assembly 86 produces a voltage which is directly proportional to the wheel speed of the vehicle as compared to a reference signal representative of vehicle speed. This voltage results in an energization of the coil 84 by an amount which increases as the amount of slip increases. This voltage reaches its full or maximum value at the beginning of objectionable slip (line 36). The structure of the sensor assembly 86 is set forth in considerable detail in application Ser. No. 665,609 filed by Robert A. Mueller, et al. on Sept. 5, 1967 and titled "Braking System" and assigned to the same assignee as the present application.

The flow of current of a predetermined magnitude through the control coil 84 which is located in the magnetic field provided by field coil 92 effects movement of the control coil 84 relative to the field coil 92 against the urging of the spring 94. The inward movement of the coil 84 effects movement of the housing 88, and thus, the spring 94 is compressed by inward movement of the housing 88. The amount of movement of the control coil 84 and housing 88 is proportional to the voltage developed in the control coil 84. The voltage developed in the control coil 84 is in turn directly proportional to the rotational speed of a wheel of the vehicle compared to the speed of the vehicle. Thus, the movement of the housing 88 is proportional to a function of the rotational speed of at least one wheel of the vehicle compared to the speed of the vehicle. Of course, other known transducers could be substituted for the transducer 80.

The control assembly 82 interconnects the transducer 80 and booster control valve 54 to operate the control valve to extents which are proportional to variations in the function of the rotational speed of the wheels of the vehicle compared to the speed of the vehicle. This operation of the control valve 54 changes the pressure in the conduit 58 and the forward chamber 26 at a rate which is a function of the extent of operation of the control valve 54. Accordingly, the control assembly 82 includes a control member or lever 100 which is pivotally connected at 102 to a link 104 connected to the housing 88. Movement of the housing 88 pivots the lever 100 about one end, that is at 105, to move the opposite end 106 of the lever which is connected to a power amplifier assembly 108.

The amplifier assembly 108 amplifies a relatively weak input signal from the transducer 80 to provide a relatively strong output signal to actuate the control valve 54. The input signal is transmitted from the transducer 80 to a relay valve 112 in the amplifier 108 by a link 114 connected to the control lever 100. The relay valve 112 includes a valve member 116 which is moved between openings at the ends of a "vacuum" or low pressure line 118 and an atmospheric or relatively high pressure line 120 to thereby control the pressure in a chamber 124. The valve 116 is normally in a position shown in FIG. 1 blocking the end of the line 118 and venting the chamber 124 to the atmosphere through the conduit 120. When the control coil 84 is energized and the control lever 100 is pivoted downwardly, the valve 116 is pivoted a proportional distance toward the conduit 120. This opens the end of the conduit 118 to connect the low pressure source to the chamber 124 and thereby reduce the pressure in the chamber. Thus, the pressure in the chamber 124 is varied as a direct function of the movement of the control lever 100 under the influence of the transducer 80.

An output signal from the power amplifier assembly 108 is transmitted to the control valve 54 by links 134 and 136 to vary the position of the control valve 54 as a function of variations in the pressure in the chamber 124 as a result of operating the relay valve 112. Accordingly, the amplifier assembly 108 includes a vacuum motor actuator 138 having a diaphragm 140 which is pressed against an outer end portion of a housing 141 by a spring 142. When the pressure in the chamber 124 is reduced by movement of the valve member 116 toward the conduit 120, the diaphragm 140 is pressed downwardly by atmospheric pressure entering the housing 141 through an opening 144. This downward movement of the diaphragm 140 pivots the link 136 to operate the valve 54 as a function of the movement of the diaphragm 140. Thus, the relatively weak input signal from the transducer 80 is used to operate the relay valve 112 to change the position of the diaphragm 140. The diaphragm 140 provides a relatively strong output signal which is linearly proportional to the input signal for actuating the control valve 54.

When the initial slipping begins, it is necessary for the antiskid system to respond quickly to maintain the pressure in the brake line 28 at a pressure corresponding to a nonobjectionable slip condition. This pressure is such as to result in the rotational speed of the wheels of the vehicle compared to the speed of the vehicle being in the nonobjectionable slip range 38 of FIG. 2. In order to provide a rapid positive response in the brake system 12, the antiskid system 10 is initially operated to provide a relatively high rate of reduction of the pressure in the line 28 by moving or operating the valve 54 further than is necessary to effect the required pressure reduction. A feedback assembly 150 subsequently decreases the rate of pressure reduction to prevent a pulsing of the braking pressure between an amount which is too great, causing skidding, and an amount which is too low, causing ineffective braking of the vehicle. Accordingly, the feedback system 150 reverses the previous excessive operation of the valve 54 by an amount which is a function of a pressure reduction effected at the initial relatively high rate of pressure reduction. After operation of the feedback assembly 150, the valve 54 is located in such a position as to provide the pressure corresponding to a nonobjectionable slip condition without pulsing of the brake system 12.

The feedback assembly 150 includes a pressure chamber 154 which is connected by a conduit 156 to the conduit 58. Before operation of the antiskid system 10, the control valve 54 is in the position shown in FIG. 1 connecting the chamber 56 to the source of relatively low pressure through the conduits 62 and 68. This low pressure is transmitted to the front chamber 26 of the power booster and to the pressure chamber 154 of the feedback assembly 150. A diaphragm 160 forming one wall of the chamber 154 is forced inwardly by atmospheric pressure against an outer surface of the diaphragm to compress a spring 162.

Upon initial operation of the antiskid system 10, the valve member 73 of the control valve 54 is moved through a relatively large distance to a first position in order to provide an initial relatively high rate of pressure increase in the conduit 58 and front chamber 26 of the power booster. This high rate of pressure increase in the chamber 26 of the power booster is a function of the distance through which the valve member 73 is moved and results in a rapid decrease in the pressure in the brake line 28. Therefore, the valve 54 is operated to a first position in response to a slip signal to provide a rapid increase in the pressure in the conduit 58 and a corresponding rapid decrease in the pressure in the brake line 28.

The feedback assembly 150 operates in response to the increase in pressure effected in the conduit 58 to partially reverse the operation of the valve 54 and thereby provide a steady state pressure in the conduit 58 and brake line 28 corresponding to the predetermined pressure. Accordingly, the increase in pressure in the conduit 58 is transmitted by the conduit 156 to the pressure chamber 154. As the pressure in the chamber 154 increases, the diaphragm 160 is moved outwardly under the influence of the spring 162 to actuate the control lever 100 through the link 166. The control lever 100 then pivots in a clockwise direction, as viewed in FIG. 1, about the pivot point 102 to move the valve member 116 of the relay valve 112 back toward the conduit 118. This movement of the valve member 116 toward the conduit 118 is less than the initial movement of the valve member away from the conduit so that the chamber 124 is still connected by the conduit 118 to a source of low pressure.

This actuation of the relay valve 112 increases the pressure in the chamber 124 and results in an outward movement of the diaphragm to move the valve element 73 of the control valve 54 toward the conduit 60. This partial reversal of the previous operation of the control valve 54 decreases the pressure in the conduit 58 to increase the effectiveness of the power booster 14. It should be noted that the decrease in pressure in the conduit 58 under the influence of the feedback assembly 150 is proportional to the original input signal received from the transducer 80. This proportionality results from the fact that the initial increase in pressure in the conduit 58 is proportional to the signal from transducer 80 and the subsequent decrease in pressure is proportional to and smaller than the previous increase.

A preferred embodiment of an antiskid system constructed in accordance with the schematic diagram of FIG. 1 is illustrated in FIGS. 3—6. In the embodiment of the invention illustrated in FIGS. 3—6, structural elements have been given numerical designations which are the same as the numerical designations given to corresponding elements in FIG. 1, the suffix letter *a* being added to the numerical designations of FIGS. 3—6 to avoid confusion.

The structure of a control valve 54a of the antiskid system 10a is best seen in FIGS. 3 and 4. The booster control valve 54a includes a valve element 73a which is connected by links 134a and 136a (see FIG. 3) to an amplifier assembly 108a. The valve member is movable in a chamber 56a between open ends 72a and 74a of conduits 60a and 62a to control the pressure in the conduit or line 58a. Thus, upon the occurrence of slip, the valve element 73a is pivoted upwardly toward the conduit 62a to vent the conduit 58a to the atmosphere through the conduit 60a and thereby reduce the effectiveness of a power booster, similar to the power booster 14 of FIG. 1, to decrease the fluid pressure actuating the brakes of the vehicle.

A control solenoid or transducer 80a is shown in FIGS. 4 and 5. The transducer 80a includes a control coil 84a which is connected in an electrical circuit in which the voltage is varied as a function of the speed of rotation of the wheels of the vehicle compared to the speed of the vehicle. The control coil 84a is mounted on a plastic housing 88a for movement relative to a magnetizable base 90a of a continuously energized field coil 92a. The control coil 84a is located in an annular space or gap 93a in the base 90a so that the control coil is surrounded by a magnetic field emanating from the field coil 92a and flowing through the base 90a and across the gap 93a. Therefore, when the voltage in the control coil 84a is varied, by a sensor assembly (not shown) similar to the one disclosed in the aforementioned application Ser. No. 665,609 by Robert Mueller et al., the control coil 84a moves toward the field coil 92a.

The previously described movement of the control coil 84a is resisted by spring 94a which engages the housing 88a on which the control coil is mounted. Since the voltage in the control coil 84a varies as a function of the speed of the vehicle compared to the speed of rotation of the wheels of the vehicle, the magnetic force moving the housing 88a against the influence of the spring 94a is directly proportional to this function. Therefore, movement of the housing 88a and link 104a provides a signal which is proportional to a function of the speed of the vehicle compared to the rotational speed of the wheels of the vehicle.

The control assembly 82a is shown in FIGS. 4 and 5 and includes a control lever 100a which is pivotally connected at a central point 102a to the link 104a. One end of the control lever 100a is pivotally connected, at 105a, to the feedback assembly 150a. The opposite end of the control lever 100a is pivotally connected at 106a to a link 114a to operate a relay valve 112a in a power amplifier assembly 108a. Movement of the housing 88a pivots the control lever 100a in a counterclockwise direction (as viewed in FIG. 4) about the pivot 105a. The pivoting movement of the control lever 100a pivots the link 114a in a counterclockwise direction (as viewed in FIG. 4) to move a valve member 116a of a relay valve 112a away from the end of a conduit 118a. The conduit 118a is connected to a "vacuum" or low pressure source. Therefore, movement of the valve member 116a decreases the pressure in a chamber 124a (see FIG. 4 taken in conjunction with FIG. 5). Decreasing the pressure in the chamber 124a results in a diaphragm 140a being moved inwardly against the influence of a spring 142a to move the link 134a to the right as viewed in FIG. 5 or downwardly as viewed in FIG. 3 to operate the control valve 54a.

After a relatively large initial movement of the valve member 73a of the control valve 54a to provide a relatively high initial rate of increase in the pressure in the conduit 58a and a corresponding high initial rate of decrease in the pressure actuating the brakes of the vehicle, the feedback assembly 150a (see FIG. 4) is operated to actuate the control assembly 82a to decrease the pressure in the conduit 58a and effect a corresponding increase in the fluid pressure actuating at the brake assemblies. The feedback assembly 150a includes a diaphragm 160a (FIG. 4) which is movable against the influence of a spring 162a to vary the size of a pressure chamber 154a. The diaphragm 160a moves upwardly in the chamber 154a as the amount of pressure in the conduit 156a is increased by the previously described operation of the control valve 54a. This movement pivots the control lever 100a about the pivot point 102a and moves the link 114a in a clockwise direction (as viewed in FIG. 4). Movement of the link 114a moves the valve member 116a back toward the low pressure conduit 118a to increase the pressure in the chamber 124a (see FIG. 5) to thereby move the valve member 200 of the control valve 54a back toward its initial position.

The structure of the control valve 54a is shown in greater detail in FIG. 6. It can be seen that the valve member 73a is pivotally mounted within a chamber 56a in a housing 210. The valve member 73a is movable from a position blocking the end portion 72a of the conduit 60a to a position blocking or at least partially blocking the end portion 74a of the conduit 62a. Of course, other structures could be used for the valve 54a.

When the driver of a vehicle operates the brakes, by depressing a brake pedal, similar to the brake pedal 20 of FIG. 1, the wheel brakes are actuated under the influence of a power booster and master cylinder. As long as there is no slip, that is as long as the rate of rotation of the wheels of the vehicle are above the minimum rotational speed indicated by the line 34 in FIG. 2, the antiskid system 10a will have no effect on the braking of the vehicle. When slipping of the vehicle begins, as indicated at 44 in FIG. 2, the antiskid system 10a is operated to reduce the fluid pressure actuating the brakes of the vehicle to thereby enable the speed of rotation of the wheels of the vehicle to increase to a speed above the minimum rotational speed which is necessary to avoid objectionable slipping.

Accordingly, when slipping first begins the control coil 84a will be energized by the associated sensor assembly with a voltage which is proportional to the function of the rotational speed of the wheels of the vehicle compared to the speed of the vehicle. The housing 88a then moves toward the field coil 92a to pivot the control lever 100a in a counterclockwise direction (as viewed in FIG. 4) about the pivot 105a. This pivoting movement of the control lever 100a will operate the relay valve 112a to connect the chamber 124a with a source of low pressure. The resulting low pressure in the chamber 124a enables atmospheric pressure entering through openings 144a in the housing to press the diaphragm 140a inwardly against the influence of the spring 142a. This movement of the diaphragm 140a will be proportional to the function of the speed of the vehicle compared to the speed of rotation of the wheels of the vehicle since the operation of the relay valve 112a, and the change in pressure in the chamber 124a, is directly proportional to the magnitude of the signal from the transducer 80a.

Movement of the valve member 73a vents the conduit 58a to the atmosphere to rapidly increase the pressure in the front chamber of the associated power booster. Since the valve member 73a is operated to an extent which is a function of the signal from the transducer 80a and the rate of increase in the pressure in the front chamber of the power booster is a function of the extent of operation of the valve member 73a, the pressure in the front chamber of the power booster is increased at a rate which is a function of the rotational speed of the wheels of the vehicle compared to the speed of the vehicle. As the pressure in the front chamber of the power booster is increased, the master cylinder is actuated to effect a corresponding decrease in the fluid pressure in the brake line. The increase in the pressure in the conduit 58a is also transmitted to the feedback assembly 150a to pivot the control lever 100a about the pivot point 102a. This movement of the control lever 100a is proportional to and smaller than the previous movement of the control lever 100a. Therefore, the control lever 100a operates the valve member 116a part way back to its original position to thereby increase the pressure in the chamber 124a. The increase in pressure in the chamber 124a moves the diaphragm 140a outwardly to operate the control valve 54a part way back to its initial position to thereby decrease the rate of pressure increase in the conduit 58a. The amount of the reduction in the rate of pressure increase is proportional to but smaller than the initial rate of increase in pressure. The second position of the control valve 54a is such as to provide a steady state pressure in the conduit 58a and brake line corresponding to a nonobjectionable skid condition.

Although some objectionable slipping may occur, most slipping will be limited to a minimum amount shown between lines 34 and 36. While a preferred embodiment of the invention has been shown, it should be understood, of course, that the invention is not limited thereto since many modifications may be made therein. Therefore, it is contemplated to cover by the appended claims any such modifications as fall within the true spirit and scope of the invention.

I claim:

1. An assembly for controlling the application of the brakes of a vehicle, said assembly comprising signal means operable during braking of a vehicle for producing a slip signal which is proportional to a function of the rotational speed of at least one wheel of the vehicle compared to the speed of the vehicle, a valve operatively associated with the brakes of the vehicle, and control means operatively connected to said signal means and said valve for operating said valve in a first direction from an initial condition to an extent which is a function of said slip signal to thereby reduce the pressure applied to the brakes at a rate which is a function of said slip signal, said control means including feedback means operable to effect operation of said valve in a second direction opposite to said first direction as the pressure applied to the brakes is reduced.

2. An assembly as set forth in claim 1 wherein said valve is operated through a relatively large distance in said first direction to provide a rapid response to said slip signal and is operated in said second direction through a distance which is proportional to and smaller than said first distance to thereby provide a rapid reduction in the pressure operating the brakes of the vehicle.

3. An assembly as set forth in claim 1 wherein said control means includes a lever means operatively connected at a first portion to said feedback means, at a second portion to said signal means and at a third portion to said valve, said lever means being pivotal at said first portion by said signal means to operate said valve in said first direction, said lever means being pivotal at said second portion by said feedback means to operate said valve in said second direction.

4. An assembly as set forth in claim 1 wherein said valve is connected in fluid communication with a power booster unit associated with the brakes of the vehicle, said valve being operable to effect the operation of said power booster unit to thereby vary the pressure applied to the brakes, said feedback means being connected in fluid communication with both said valve and said power booster unit and responsive to operation of said valve in said one direction to operate said valve in said second direction.

5. An assembly as set forth in claim 1 wherein said means for producing a signal includes a control coil which is movable relative to a field coil, said control coil being moved relative to said field coil through distances which vary with said function to the rotational speed of at least one wheel of the vehicle compared to the speed of the vehicle to thereby produce said signal.

6. An assembly as set forth in claim 5 wherein said valve is connected to a power booster unit associated with the brakes of the vehicle, said valve being operable to effect the operation of said power booster unit to thereby vary the pressure applied to the brakes of the vehicle, and a movable member operatively connected to said control coil, said feedback means and said valve, said member being moved in one direction by movement of said control coil to operate said valve in said one direction to effect the operation of said power booster unit to decrease at a relatively fast rate the pressure applied to the brakes, said member being moved in another direction by said feedback means to operate said valve in said second direction to provide a pressure corresponding to a nonobjectionable slip condition.

7. An assembly as set forth in claim 1 wherein said signal means includes a control coil connected in an electrical circuit in which the voltage is varied with variations in said function of the rotational speed of at least one wheel of the vehicle compared to the speed of the vehicle, a source of a magnetic field which extends at least partially around said control coil, and resilient means for urging said control coil in one direction relative to said source of a magnetic field, said control coil being movable in a direction opposite to said one direction against the urging of said resilient means upon flow of current therethrough, the movement of said control coil being proportional to variations in said function of the speed of a vehicle compared to the rotational speed of at least one wheel of a vehicle.

8. An assembly as set forth in claim 7 wherein said control coil is mounted on a housing of a nonmagnetic material which is substantially uneffected by the magnetic field from said source of a magnetic field.

9. An assembly as set forth in claim 7 wherein said source of a magnetic field is a field coil which is energized with a predetermined substantially constant voltage.

10. An assembly as set forth in claim 1 wherein said control means includes an amplifier means operatively connected to said valve and said signal means for amplifying the strength of said signal to operate said valve.

11. An antiskid system for use when braking a vehicle having fluid pressure actuated brakes for retarding rotation of the wheels of the vehicle to reduce the speed of the vehicle, said antiskid system comprising first means for reducing the fluid pressure actuating the brakes at an initial rate which is proportional to a function of the rotational speed of a wheel of the vehicle compared to the speed of the vehicle, and second means operative to decrease said initial rate of pressure reduction as a function of a pressure reduction effected by said first means, said first means including a valve which is connected to a source of low pressure and a power booster for operating the brakes, said valve being moved in one direction to decrease an exposure of said power booster to said source of low pressure by an amount which is proportional to said function of the rotational speed of a wheel of a vehicle compared to the speed of the vehicle to thereby provide said initial rate of reduction in the fluid pressure actuating the brakes, said valve being moved in response to said second means in another direction by an amount which is proportional to and less than said movement in said one direction to thereby increase the exposure of said power booster to said source of low pressure and to provide said decrease in said initial rate of pressure reduction.

12. An antiskid system as set forth in claim 11 wherein said second means is responsive to the degree of exposure of said power booster to said source of low pressure by said first means.

13. An antiskid system for use when braking a vehicle having fluid pressure actuated brakes for retarding rotation of the wheels of the vehicle to reduce the speed of the vehicle, said antiskid system comprising first means for reducing the fluid pressure actuating the brakes at an initial rate which is proportional to a function of the rotational speed of a wheel of the vehicle compared to the speed of the vehicle, and second means operative to decrease said initial rate of pressure reduction as a function of a pressure reduction effected by said first means, said first means including signal means for providing a signal which is proportional to said function of the rotational speed of the wheel of the vehicle compared to the speed of the vehicle and a valve associated with said signal means and said second means, said valve being operated in a first direction in response to said signal means to provide said initial rate of pressure reduction, said valve being operated in a second direction opposite to said first direction by said second means to provide said decrease in said initial rate of pressure reduction.

14. An antiskid system as set forth in claim 13 wherein said first means further includes power amplifier means for amplifying the strength of a signal from said signal means to operate said valve means in said first direction.

15. An antiskid system for use in a vehicle having a power booster for operating fluid-actuated brakes upon actuation of a brake pedal, said antiskid system being operative after actuation of said brake pedal and comprising a valve connected in fluid communication with said power booster and operable to control the pressure applied to said power booster to thereby enable the fluid pressure actuating said brakes to be varied by operation of said valve, signal means for providing a slip signal, and control means operatively interconnecting said valve and said signal means for operating said valve to vary the pressure which is applied to said power booster at an initial rate which is proportional to said slip signal to thereby reduce the fluid pressure actuating said brakes, and feedback means responsive to variations in the pressure applied to said power booster for operating said valve to decrease said initial rate of variation of the pressure applied to said power booster.

16. An antiskid system as set forth in claim 15 wherein said control means includes a member operatively connected at a first pivot point to said signal means, at a second pivot point to said feedback means, and at a third pivot point to said valve, said member being pivoted about said second pivot point by said signal means for a distance proportional to said slip signal to thereby operate said valve from said one condition to said one of said plurality of conditions, and said member being pivoted about said first pivot point by said feedback means to thereby operate said valve to said other of said plurality of conditions.

17. In an antiskid system as set forth in claim 16 wherein said control means further includes a power amplifier means connected to said member at said third pivot point for amplifying the strength of a signal generated by movement of said member about said second pivot point to move said valve from said one condition to said one of said plurality of other conditions and for amplifying the strength of a signal generated by movement of said member about said first pivot point to move said valve from said one of said plurality of other conditions to said other of said plurality of other conditions.

18. An antiskid system for use when braking a vehicle having fluid pressure operated brakes, said antiskid system comprising a valve operable to vary the fluid pressure actuating said brakes, and control means for operating said valve in response to a slip signal, said control means including a control coil connected in an electrical circuit in which the voltage is varied to provide said skid signal, means for providing a magnetic field which extends at least partially around said control coil, said control coil being movable upon flow of current therethrough, means operatively associated with said control coil and said valve to operate said valve and reduce the fluid pressure operating said brakes upon movement of said control coil, a member operatively connected to said control coil and movable from one position to another position in response to said movement of said control coil, power amplifier means operatively connected to said valve and to said member for amplifying the strength of a signal generated by said movement of said member to thereby operate said valve, and feedback means responsive to operation of said valve and connected to said member for moving said member to a position intermediate said one position and said other position to thereby transmit a feedback signal to said power amplifier means to partially reverse the operation of said valve.

19. An antiskid system as set forth in claim 18 wherein said movement of said control coil pivots said member about a point at which said member is operatively connected to said feedback means and said feedback means is operative to pivot said member about a point at which said member is operatively connected to said control coil.

20. An antiskid system for use when braking a vehicle having fluid pressure operated brakes, said antiskid system comprising signal means for providing a slip signal, a valve operable to vary the pressure applied to said brakes, a feedback means operable to partially reverse operation of said valve, and a control member operatively connected to said valve, said feedback means and said signal means, said control member being pivotal about a first point by operation of said signal means to thereby operate said valve, said control member being pivotal about a second point by said feedback means to thereby partially reverse said operation of said valve.

21. An antiskid system as set forth in claim 20 wherein said feedback means is operatively connected to said control member at said first point and said signal means is operatively connected to said control member at said second point.

22. An antiskid system as set forth in claim 21 further including a power amplifier means operatively connecting said valve to a third point on said control member, said power amplifier means being operable to amplify the strength of signals generated by pivoting movement of said control member about said first and second points.

23. An antiskid system as set forth in claim 20 wherein said signal means includes a field coil and a control coil mounted on a housing in a magnetic field emanating from said field coil, said control coil and housing being movable relative to said field coil to thereby pivot said control member about said first point.

24. An antiskid system for use when braking a vehicle having fluid pressure operated brakes, said antiskid system comprising first valve operable to reduce the pressure applied to the brakes of the vehicle, signal means for providing a slip signal which is proportional to a function of the rotational speed of at least one wheel of the vehicle compared to the speed of the vehicle, and amplifier means operatively connected to said first valve and said signal means for amplifying said slip signal and operating said first valve to an extent which varies in response to variations in said slip signal, said amplifier means including a fluid chamber, a second valve operable by said signal means to vary the pressure in said chamber as function of variations in said slip signal, and pressure responsive means operatively connected to said first valve and exposed to the fluid pressure in said chamber for operating said first valve in response to variations in the pressure in said chamber to thereby reduce the pressure applied to the brakes of the vehicle as a function of variations in said slip signal to retard slipping of the wheels of the vehicle.

25. An antiskid system as set forth in claim 24 wherein said first valve is movable for varying distances from an initial position to reduce the pressure applied to the brakes of the vehicle at a rate which varies as a function of the distance, said first valve is moved from said initial position.

26. An antiskid system as set forth in claim 25 wherein said second valve is movable for varying distances from an initial position by said signal means to vary the pressure in said chamber as a function of variations in said slip signal.

27. An assembly for controlling the application of the brakes of a vehicle, said assembly comprising signal means operable during braking of a vehicle for producing a slip signal which is proportional to a function of the rotational speed of at least one wheel of the vehicle compared to the speed of the vehicle, said signal means including a control coil connected in an electrical circuit in which the voltage is varied with variations in said function of the rotational speed of at least one wheel of the vehicle compared to the speed of the vehicle, field coil means for providing a magnetic field of substantially constant strength which extends at least partially around said control coil, a support housing connected to said control coil and formed of a nonmagnetic material which is substantially uneffected by the magnetic field provided by said field coil means, and resilient means engaging said support housing for urging said control coil in one direction relative to said field coil means, said control coil being movable in a direction opposite to said one direction against the urging of said resilient means upon flow of current therethrough, the movement of said control coil being proportional to variations in said function of the speed of a vehicle compared to the rotational speed of at least one wheel of a vehicle, a valve operatively associated with the brakes of the vehicle, and control means operatively connected to said control coil and said valve for operating said valve from an initial condition to an extent which is a function of said slip signal to thereby reduce the pressure applied to the brakes at a rate which is a function of said slip signal.

28. An antiskid system for use when braking a vehicle having fluid pressure-operated brakes, said antiskid system comprising a valve operable to vary the fluid pressure actuating said brakes during braking of the vehicle, sensor means for providing a skid signal in the form of a voltage which increases upon an increase in any tendency for the vehicle to skid during braking, control coil means electrically connected to said sensor means for providing a magnetic field which varies in strength with variations in said skid signal, field coil means for providing a magnetic field extending at least partially around said control coil means, means for supporting said control coil means for movement relative to said field coil means under the influence of an interaction between said magnetic field provided by said field coil means and said magnetic field provided by said control coil means, said magnetic fields provided by said control and field coil means interacting to move said control coil means through a distance which varies as a function of the strength of said magnetic field provided by said control coil means, power amplifier means operatively interconnecting said means for supporting said control coil means and said valve means for amplifying forces causing movement of said control means relative to said field coil means to thereby provide a relatively large force for operating said valve.

29. An antiskid system as set forth in claim 28 wherein said power amplifier means includes a fluid motor means including a chamber and means for varying the fluid pressure in said fluid chamber in response to movement of said control coil means relative to said field coil means to thereby operate said fluid motor means to effect movement of said valve upon movement of said control coil means.

30. An assembly for controlling the application of the brakes of a vehicle, said assembly comprising signal means operable during braking of a vehicle for producing a slip signal which is proportional to a function of the rotational speed of at least one wheel of the vehicle compared to the speed of the vehicle, a first valve means operatively associated with the brakes of the vehicle, and pneumatic power amplifier means operatively connected to said signal means and said first valve means for operating said first valve means from an initial position to an extent which is a function of said slip signal, said pneumatic power amplifier means including a diaphragm member operatively connected to said first valve means, vacuum chamber means on one side of said diaphragm member for effecting movement of said diaphragm member in response to variations in pressure in said vacuum chamber means, said diaphragm member being movable in one direction to operate said first valve means in a first direction from the initial position to reduce the pressure applied to the brakes, said diaphragm member being movable in another direction to operate said first valve means in a second direction opposite to said first direction, and a second valve means operatively connected to said signal means for varying the pressure in said vacuum chamber means in response to variations in said slip signal to thereby effect movement of said diaphragm member and said first valve means in response to variations in said slip signal.

31. An assembly as set forth in claim 30 wherein said signal means includes a control coil connected in an electrical circuit in which the voltage is varied with variations in said function of the rotational speed of at least one wheel of the vehicle compared to the speed of the vehicle, a source of a magnetic field which extends at least partially around said control coil, and resilient means for urging said control coil in one direction relative to said source of a magnetic field, said control coil being movable in a direction opposite to said one direction against the urging of said resilient means upon flow of current therethrough, the movement of said control coil being proportional to variations in said function of the speed of a vehicle compared to the rotational speed of at least one wheel of a vehicle, said power amplifier means including means connecting said control coil with said second valve means to effect movement of said second valve means in response to movement of said control coil to thereby effect the aforesaid variations in pressure in said vacuum chamber means in response to variations in said slip signal.